Figure 1:
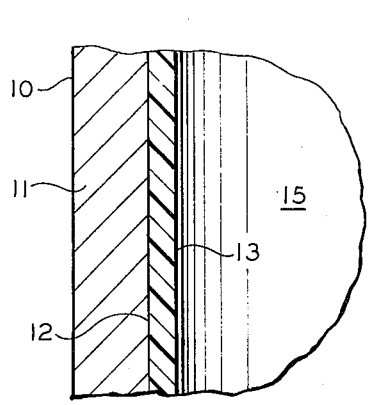

United States Patent [19]  
Fuller

[11] 3,878,092  
[45] Apr. 15, 1975

[54] CHROMATOGRAPHIC COLUMS
[75] Inventor: Edward N. Fuller, Bartlesville, Okla.
[73] Assignee: Phillips Petroleum Company, Bartlesville, Okla.
[22] Filed: Mar. 12, 1973
[21] Appl. No.: 340,355

[52] U.S. Cl. ............ 210/31 C; 55/386; 117/DIG. 3; 117/62.1; 210/198 C
[51] Int. Cl. ............................................ B01d 15/08
[58] Field of Search ......... 210/31 C, 198 C; 55/386; 117/DIG. 3, 62.1

[56] References Cited
UNITED STATES PATENTS

| | | | |
|---|---|---|---|
| 3,005,514 | 10/1961 | Cole et al. ............................. | 55/386 |
| 3,295,296 | 1/1967 | Halasz et al. ..................... | 55/386 X |
| 3,407,573 | 10/1968 | Crowley ................................. | 55/386 |
| 3,514,925 | 6/1970 | Bossart .................................. | 55/386 |
| 3,663,263 | 5/1972 | Bodre et al. .................. | 210/31 C X |
| 3,722,181 | 3/1973 | Kirkland et al. ............... | 210/31 C X |
| 3,808,125 | 4/1974 | Good .................................. | 210/31 C |

*Primary Examiner*—John Adee

[57] ABSTRACT

A chromatographic column for the separation of components of a mixture comprising a hollow member, a means for introducing a mixture into and withdrawing components from said member; means for detecting components issuing from said member; said column being provided with a partitioning agent comprising a crosslinked polymeric material bonded to an interior surface of said hollow member either directly or through an intermediate film or coupling agent. The partitioning agent is polymerized and crosslinked in situ within the hollow member.

17 Claims, 8 Drawing Figures

CHROMATOGRAPHIC COLUMNS

This invention relates to chromatographic analyzers. In one aspect, the invention relates to novel separating columns used in chromatographic analyzers. In another aspect, the invention relates to a method for preparing chromatographic columns.

Chromatographic analyzers are a widely used tool for the measurement and control of chemical processes. As a process control device, chromatographic analyzers are usually divided into two distinct units — an analyzer unit located quite near the process stream and a programmer unit that can be located where needed. The analyzer must obtain its own sample, analyze it, and process the detector information into some useful quantity. Depending on the intended use, this quantity is then delivered to either recorder, controller, or computer means. The instrument must continue to repeat the same cycle, sometimes as often as once each minute, for extended periods of time with a high degree of reliability. Briefly, analysis of a sample by the chromatographic technique involves injecting a small sample into an appropriate fluid carrier stream. The fluid carrier stream conveys the sample through a separation column which contains a material for which each of the respective components of the sample mixture has its own unique affinity or retention time. The difference in the affinity or retention time of the respective components causes the individual components of the sample to stay within the column for different lengths of time before emerging. The affinity of most liquid and gaseous compounds for various materials is well known and the order of emergence of the individual components of a sample mixture can be easily determined. As each component emerges from the column, it is passed through a detector device which measures a particular property of the respective component against a reference property of the carrier fluid. The output of the detector is representative of the amount of particular component in the sample. A recording of the output of the detector for a particular sample generally results in a multipeaked curve, wherein each peak may represent one component of the sample, and from which the quantity or percentage of each of the components can be ascertained by known procedures.

The material causing the separation within the column of the respective liquid or gaseous components of the sample is commonly called the "stationary phase" of the column. The material is also known as a partitioning agent. Separation is effected either because the stationary phase has absorbing surfaces or because the surface has been coated with a thin film of partitioning liquid for which the liquid or gaseous components of the sample have an affinity.

The separation columns generally used in chromatographic analysis have been either a packed column or a capillary column, depending upon the particular sample being analyzed and the amount thereof. Packed columns contain packed into the column discrete particles which can function as a stationary phase per se by virtue of absorbing surfaces thereon or as a support for a stationary phase comprising a thin film of partitioning liquid. Capillary columns are generally of a smaller diameter than packed columns and are not packed with a particulate separation material. Rather, said columns have the inner surfaces thereof coated with a separating liquid phase, with the column wall functioning as a support for the separation or partitioning agent.

Generally, in both types of columns, the bonding forces between the partitioning agent and the support, whether it be the column wall or discrete particles, has been due to physical adsorption. This physical bonding is relatively weak and can be overcome by thermal fluctuations in the system or by displacement by another chemical species. Further, because the effects of the bonding forces are not easily controlled, a uniform and optimum film thickness is difficult to obtain. If too much partitioning agent is used, the result may be an uneven film which adversely affects column efficiency, or a film in which the slow diffusion of the species which are to be separated causes a loss of separating speed and adversely affects the efficiency of the column. If too little partitioning agent is used, the result may be that column capacity and efficiency are too low for effective separations. More serious, the partitioning agent may migrate and the separating behavior of the column will then be unstable.

It is an object of this invention to provide novel chromatographic columns.

It is another object of this invention to provide chromatographic columns wherein the partitioning agent comprises a discrete polymeric film.

It is another object of this invention to provide a novel apparatus for making chromatographic separations.

A still further object of this invention is to provide a method for making capillary and packed chromatographic columns.

These and other objects, aspects, and advantages of the invention will be apparent from the disclosure, accompanying drawings, and appended claims.

The present invention provides a novel column particularly adapted to chromatographic separations which is characterized by having as the partitioning or stationary phase an essentially continuous discrete film of a highly porous, high surface area, crosslinked polymeric material, said partitioning phase having been formed in situ within the column through the polymerization of a suitable mixture of monomers following the introduction of such monomers into the interior of the column.

In one presently preferred embodiment, the partitioning agent is formed in the presence of certain selected coupling agents, whereby the partitioning agent is more firmly anchored to the support at least chemically through valence bonds. In this latter embodiment, the chemical bonding of the polymeric stationary phase to the support, i.e., column wall and/or particulate material, more effectively inhibits migration of the stationary phase.

A particular feature of the present invention is the provision of a stable partitioning agent comprising a high molecular weight, highly porous, high surface area polymeric material, which can be bonded to the inner wall of the chromatographic column itself and also to relatively inert particulate support material when such materials are used.

The practice of the present invention is applicable for use in preparing packed and capillary columns for use in both gas and liquid chromatographic determinations.

Thus, according to this invention, there is provided in one embodiment a novel chromatographic column having therein a polymeric partitioning agent formed by the in situ polymerization of a suitable polymerizable monomer or mixture of polymerizable monomers. In a preferred embodiment, the polymeric partitioning agent is bonded to the support material at least chemically through valence bonds to a selected coupling agent, which coupling agent is in turn chemically bonded to the support. In this latter embodiment, the partitioning agent comprises a polymeric material formed in situ from a mixture of polymerizable monomers wherein at least one of such polymerized monomers has two or more reactive groups or radicals such that a chemical bond can be formed between the coupling agent and ultimate partitioning agent, without interfering with the in situ polymerization of the mixture of polymerizable monomers. The partitioning agent may also be bound to the coupling agent by chain entanglement, the type of bonding which can normally be accomplished for polymers of unlike chemical composition only when one polymer is formed in situ from a solution of monomer in the other polymer.

Broadly, in accordance with the present invention, there is provided a chromatographic column having a stable uniform film of a crosslinked polymeric stationary phase chemically bonded to the column and/or support material when used; as well as a method for preparing such columns by the in situ polymerization of the stationary phase.

The invention is particularly useful in preparing capillary-type columns such as those disclosed in U.S. Pat. No. 2,920,478. Such columns generally comprise a circular tube or hollow member of extended length having an internal diameter approaching capillary dimensions. The hollow member will generally have an internal diameter of from 0.001 to 0.003 inch and a length which can be on the order of 100 to 500 feet. The dimensions per se are not critical, although extreme lengths require that the columns be coiled in order to fit into a temperature bath and the small diameter does require care in handling. In such capillary columns, the stationary phase can be directly bonded to the interior wall of the hollow member comprising the chromatographic separation column. Alternatively, the column can be first coated with a coupling agent which is capable of bonding chemically through valence bonds to the interior wall of the column. This finite film of coupling agent is overcoated with certain polymerizable monomers. The polymerizable monomer(s) is (are) polymerized in situ to a crosslinked polymeric phase which forms the partitioning agent and which is interlocked with the coupling agent by at least a chemical bond to valence bonds.

Thus, the present invention provides chromatographic columns having, as a stationary phase or partitioning agent, a continuous discrete crosslinked polymeric material of an essentially uniform finite thickness integrally bonded chemically through valence bonds to the interior wall or surface of the column and/or other support material, when used. The invention further provides columns wherein the crosslinked polymeric partitioning agent is bonded to the surfaces of the column or other support through a coupling material or agent. In this latter embodiment, the coupling agent is directly bonded to the column wall or other support chemically through valence bonds and is bonded to the polymeric partitioning agent chemically through valence bonds, physically as by chain entanglement, or by a combination of physical and chemical bonding forces.

It is a feature of the present invention that the chromatographic column member per se be constructed of a rigid material having reactive groups on the surface exposed to the column interior, such as surface hydroxyl groups, and which is otherwise nonreactive with a polymeric partitioning agent and/or coupling agent. Suitable materials of construction for such columns which possess the requisite attributes include glass, quartz, steel and metals such as aluminum, iron, copper, tin, titanium, chromium, nickel and the like, whose surface contains hydrated metal oxide groups which provide the requisite surface hydroxyl groups; with steel being presently preferred as a material of construction. For packed columns, any of the support materials commonly employed as support packing can be used in the practice of the invention, providing that such support materials have reactive groups on the surfaces thereof and are otherwise nonreactive with the polymeric partitioning agent and/or coupling agent.

The crosslinked polymeric materials applicable as partitioning agents in the practice of the invention can be broadly described as an addition polymer having terminal end groups capable of reacting with the surface hydroxyl groups of the column wall to effect a chemical bonding through valence forces through the polymeric stationary phase and the column wall; or which are capable of reacting with reactive groups of the coupling agent when used, to effect at least a chemical bonding through valence forces between the polymeric stationary phase and the coupling agent; it being understood that there can be present at least some physical bonding as by chain entanglement.

The crosslinked polymeric materials which are suitable for use in forming stationary phases in accordance with the present invention are selected from the group consisting of polymers of at least one divinyl aromatic hydrocarbon and copolymers of at least one divinyl aromatic hydrocarbon and at least one monovinyl aromatic hydrocarbon. The crosslinked copolymers of divinyl aromatic hydrocarbons and monovinyl aromatic hydrocarbons contain from 10 to 80, preferably 20 to 75, and preferentially 40 to 60, percent by weight of divinyl aromatic hydrocarbon. Exemplary monomers which can be used in forming the crosslinked stationary phase in accordance with the present invention include divinylbenzene, divinyltoluene, divinylxylene, styrene, ethylvinylbenzene, vinyltoluene, vinylxylene, isopropylstyrene, t-butylstyrene, sec-butylstyrene, and the like. A presently preferred polymeric partitioning phase is a divinyl aromatic hydrocarbon-monovinyl aromatic hydrocarbon copolymer containing from 40 to 60 percent by weight of divinyl aromatic hydrocarbon.

The crosslinked polymeric stationary phases can be prepared by polymerizing the monomer(s) in admixture with from about 0.5 to about 20 times the weight of monomer(s) of a solvent or diluent that is at least miscible with the monomer(s) and which exhibits or has limited solubility for the crosslinked polymeric product.

The solvent or diluent for the monomer(s) must be nonpolymerizable with the monomer(s) and not dissolve or swell the crosslinked polymer. Suitable inert solvents or diluents include aromatic hydrocarbons such as toluene or ethylbenzene and aliphatic compounds such as n-heptane and alcohol such as isoamyl alcohol. Mixtures of such aromatic and aliphatic diluents can be employed. Generally, the characteristics of the polymer, such as density and porosity, are affected by the type of inert diluent employed. At the present time, aliphatic compounds are preferred diluent materials when the polymer product is a polymer of at least one divinyl aromatic hydrocarbon or, when the polymer product is a copolymer of at least one divinyl aromatic hydrocarbon and at least one monovinyl aromatic hydrocarbon, the amount of divinyl aromatic hydrocarbon employed in forming such copolymers is above about 60 percent by weight. Aromatic diluents are preferred for use in forming crosslinked copolymers of at least one divinyl aromatic hydrocarbon and at least one monovinyl aromatic hydrocarbon when the amount of divinyl aromatic hydrocarbon employed in forming such copolymers is in the range of about 40 to about 60 percent by weight. A mixture, preferably in equal weight amounts, of aromatic and aliphatic diluents, is preferred when the amount of divinyl aromatic hydrocarbon employed in forming divinyl aromatic hydrocarbon-monovinyl aromatic hydrocarbon copolymers is below about 40 percent by weight.

Suitable coupling agents which can be employed in the practice of the present invention include vinylalkoxysilane compounds characterized by the formula

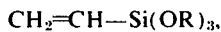

$$CH_2=CH-Si(OR)_3,$$

wherein R is an alkyl radical having from one to eight, preferably one to four, carbon atoms. Representative of such coupling agents are vinyltrimethoxysilane, vinyltriethoxysilane, vinyltri-t-butoxysilane, vinyltriethylethoxysilane, vinyltriisooctoxysilane, vinyltrioctoxysilane, and the like, the vinyltrimethoxysilane and vinyltriethoxysilane being presently preferred coupling agents.

The present invention further provides processes for the manufacture of chromatographic separating columns comprising a hollow member having an interior wall, said interior wall having integrally bonded directly thereto, as by chemical means through valence bonds, a partitioning agent comprising a crosslinked polymeric material. Said interior wall having integrally bonded directly thereto, as by chemical means through valence means, a partitioning agent comprising a crosslinked polymeric material, or having integrally bonded indirectly thereto through an intermediate monomeric film a partitioning agent comprising a crosslinked polymeric material, wherein said intermediate film is bonded to said interior wall as by chemical means through valence bonds and to said crosslinked polymeric partitioning agent as by chemical means through valence bonds, physical interlocking, or a combination of physical and chemical means.

Broadly, the chromatographic columns of this invention are prepared by a process comprising coating the interior wall of the chromatographic column with a monomer solution and thereafter polymerizing said monomer solution in situ. In addition to forming a crosslinked polymeric partitioning agent, the polymerization reaction affects bonding of the polymeric partitioning agent to said interior wall.

More particularly, chromatographic columns are prepared according to this invention by a process comprising coating the interior wall surface of the chromatographic column with a polymerizable partitioning agent-forming compound, said compound being characterized by reactive groups capable of chemically bonding to said column under conditions conducive to polymerization of said compound; polymerizing said polymerizable partitioning agent-forming compound to a crosslinked polymeric state; and removing the excess partitioning agent. The steps of coating, polymerizing and removal of excess partitioning agent can be repeated as often as necessary to obtain the desired thickness of the partitioning agent.

Such processes further comprise coating the interior wall surface of the chromatographic column with a coupling agent, said coupling agent being characterized by having reactive groups capable of chemically reacting with the column wall and a second set of reactive groups capable of entering into a polymerization reaction; removing the excess coupling agent; overcoating said coupling agent with a polymerizable partitioning agent-forming compound, said partitioning agent being characterized by reactive groups capable of interpolymerizing with said coupling agents; polymerizing in situ said polymerizable partitioning agent to a crosslinked polymeric state; and removing the excess partitioning agent. The steps comprising coating the coupling agent, coating with a polymerizable partitioning agent-forming compound, in situ polymerization and excess removal of excess partitioning agent can be repeated as often as necessary to obtain the desired thickness of partitioning agent.

In the formation of chromatographic columns containing a packing material such as diatomaceous earth, the above-described processes are modified as follows:

1. The chromatographic column can be packed with a particulate packing material prior to the introduction of the polymerizable partitioning agent-forming compound into the interior wall of the capillary column.

2. The partitioning agent can be deposited onto the packing material and polymerized in situ prior to placing the packing medium within the interior of the column. In this case, a coupling agent and/or additional partitioning agent-forming material can then be introduced into the column interior in order to effect bonding and subsequent anchorage in place of the partitioning agent. Various other modifications will be readily apparent in view of this disclosure.

The initial coating step, i.e., the coating of the interior wall of the chromatographic column, can be performed by conventional methods such as are used for coating capillary columns which involve introducing a solution or vapor containing polymerizable partitioning agent-forming compound, the coupling agent, or an admixture of coupling agent and polymerizable partitioning agent-forming compound, together with any necessary catalyst or polymerization initiators, into the column and forcing it by air pressure or inert gas pressure therethrough.

The process steps directed to the removal of excess partitioning agent or coupling agent can be performed by measures such as by flushing the column with a suitable solvent, by purging the system with an inert gas at room temperature or an elevated temperature, or such other methods as are readily available to the art.

Most efforts involve polymerization or copolymerization and can be performed at conditions known in the art. For example, a free radical generating compound such as an organic peroxide, e.g., benzoyl peroxide, can be employed to initiate the polymerization. At present, it is preferred that the polymerization step be conducted in the presence of an inert hydrocarbon diluent. The degree of polymerization can be controlled by the residence time in the presence of an initiator catalyst at a given monomer concentration and temperature. The thickness of the film can be controlled by the number of successive repetitions of the coating with monomer and polymerization of monomer. In such polymerization, the thickening of the film may take place either by chain extension or by the formation of new chains which are entangled on the molecular scale with the chains of the first coat. It should be observed at this point that the present invention offers a convenient method for controlling or increasing the effective thickness of the polymer film in the column. Heretofore, the thickness was controlled by the quantity of liquid, of constant molecular weight, transported into the column. Generally speaking, the ultimate purging step, i.e., removal of excess partitioning agent, will usually be accomplished by purging the column at an elevated temperature with an inert gas. The temperature at which the column, which has been prepared according to this invention, would then be employed and any separation process would be below the elevated temperature employed in the purging or conditioning step.

In FIG. 1, there is illustrated a first embodiment of the invention comprising a chromatographic column wherein the partitioning agent is directly bonded chemically to the interior wall of the column. In this embodiment, chromatographic column 10 comprises a hollow member 11 having an interior wall 12, a partitioning agent 13 bonded to the interior wall 12, and an axially extending opening 15 extending through the column 10. In practice, an inert carrier, such as gaseous helium or nitrogen, conveys the sample to be analyzed through the opening 15 and thereby provides a mobile phase for the chromatographic analysis. The partitioning agent 13 selectively adsorbs the components of the samples, thereby acting as a stationary phase. Such a system can be described as the elution-partition technique. It is important that the internal wall 12 of hollow member 11 be covered with partitioning agent 13 and that the thickness thereof be as uniform as possible.

Figure 2:
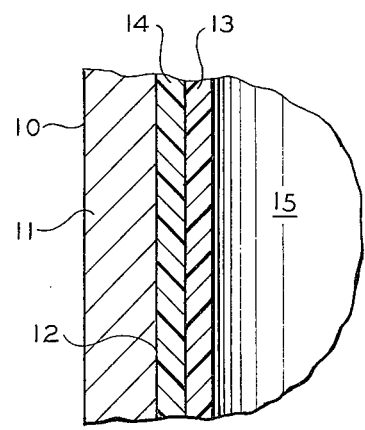

In FIG. 2, there is illustrated a second embodiment of the invention comprising a chromatographic column wherein the partitioning agent is indirectly bonded through an intermediate film or coupling agent to the interior wall of the column at least by chemical means. In this embodiment, the coupling agent 14 is chemically bonded to wall 12 of hollow member 11 and chemically, physically or by combination of chemical and physical means to partitioning agent 13.

Figure 3:
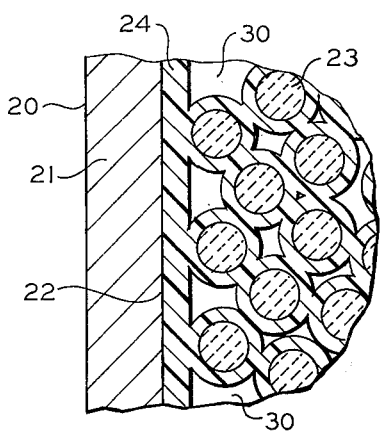

In FIG. 3, there is illustrated a third embodiment of the invention wherein the embodiment of FIG. 1 has been adapted for use in the packed column. In this embodiment, chromatographic column 20 comprises a hollow member 21 having an internal wall 22, discrete particulate packing material 23 dispersed within the interior of hollow member 21, and partitioning agent 24. In this embodiment, partitioning agent 24 is directly bonded to both interior wall 22 of hollow member 21 and packing material 23 by chemical means. The packing material 23 provides, in combination with wall 22, support for the partitioning agent 24 and also provides contact area for the partitioning agent. In the packed columns, the carrier gas, in conveying the samples through the system, passes through the interstices of the porous medium provided by the packed column. Consequently, the loading, which refers to the amount of the stationary phase in this system, is critical. Too much partitioning agent collects in pools between the particles resulting in decreased efficiency in the column. On the other hand, if too little partitioning agent is used, the optimum capacity of the column is not obtained; and there may even be absorbing sites exposed which is detrimental to the column operation. The size of the particles will depend upon the pressure drop permissible in the system. For ⅛-inch diameter columns, 100–120 or 80–100 mesh particle size is preferred; for ¼-inch diameter columns, 40–60 or 60–80 mesh particle size is preferred. The mesh numbers refer to standard ASTM screen.

Figure 4:
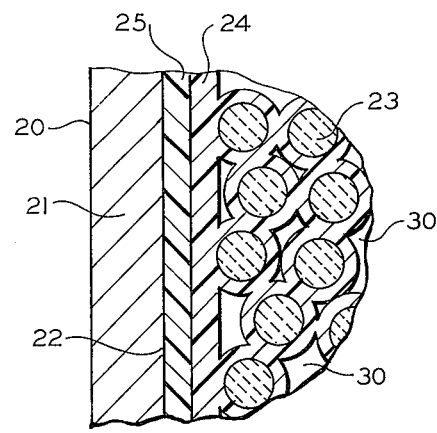

In FIG. 4, there is illustrated a fourth embodiment of the invention wherein the embodiment of FIG. 2 has been adapted for use in a packed column in a manner akin to the embodiment of FIG. 3. In this case, partitioning agent 24 is directly bonded to packing material 23 by chemical means and to the intermediate film, i.e., coupling agent, 25 by physical means, chemical means, or a combination of such means. Coupling agent 25 is in turn directly bonded as by chemical means to the wall 22 of hollow member 21.

Figure 5:
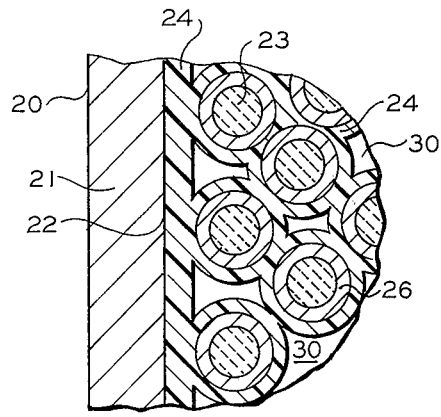
Figure 6:
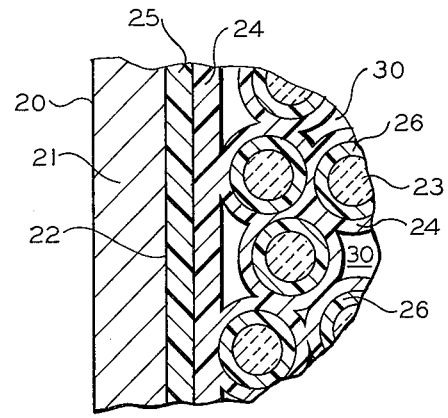

In FIGS. 5 and 6, there are illustrated other embodiments of the invention wherein the previously described embodiments have been adapted for use in packed columns. In the embodiment shown in FIG. 5, partitioning agent 24 is bonded to coupling agent 26 by chemical means, physical means, or a combination of such means, and to wall 22 of hollow member 21 by chemical means. The coupling agent 26 is in turn directly bonded as by chemical means to packing material 23. In the embodiment shown in FIG. 6, the partitioning agent 24 is bonded to coupling agents 25 and 26 in the same manner as the bonding described in FIG. 5 and coupling agents 25 and 26 are directly bonded as by chemical means to the packing material 23 at wall 22 of hollow member 21, respectively.

Figure 7:
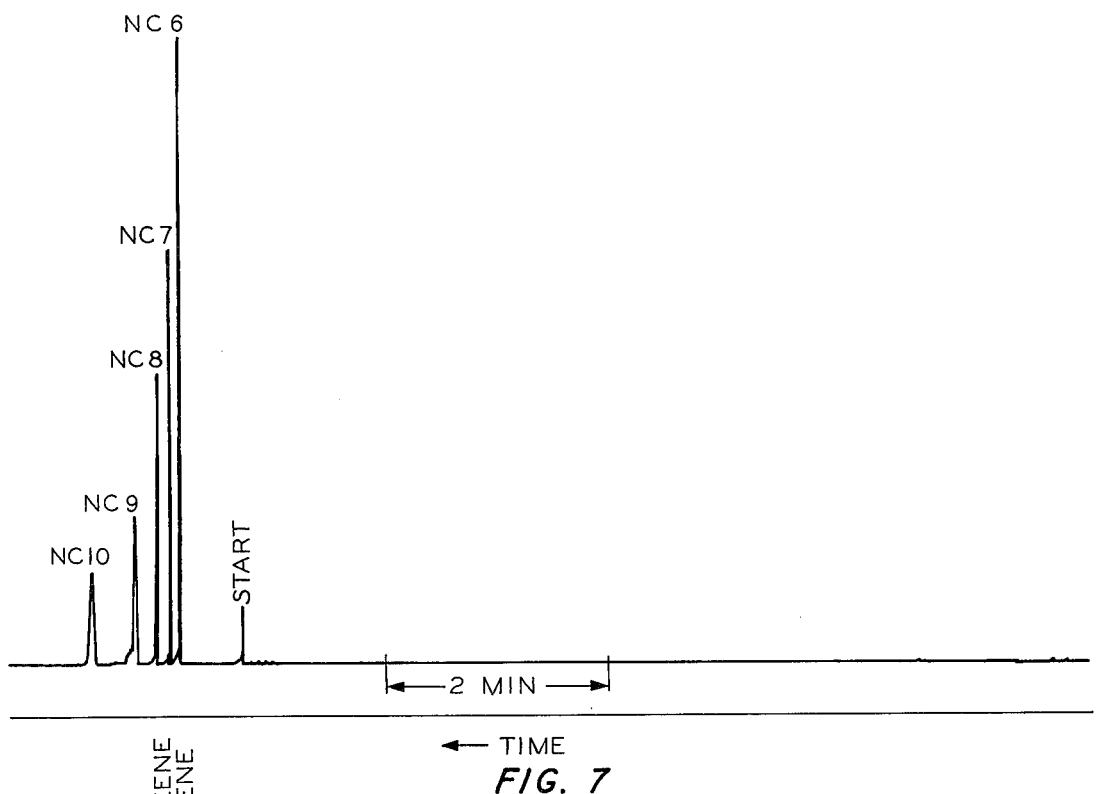
Figure 8:
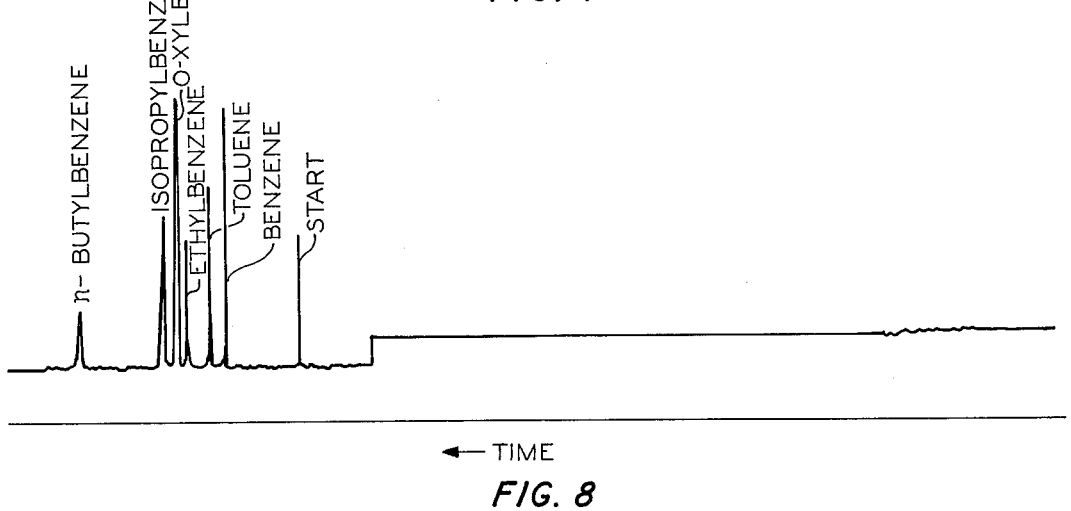

FIGS. 7 and 8 are reproductions of representative strip chart recordings in which the partitioning agent is a copolymer of styrene-divinylbenzene-ethylvinylbenzene bonded to the column through vinyltriethoxysilane coupling agent.

In a broad sense, the novel chromatographic columns of this invention are prepared by a process comprising depositing a partitioning agent-forming polymerizable monomer or mixture of monomers, either liquid, from solution or from a vapor state, within the interior of the column and thereafter polymerizing said monomer(s) in situ, whereby a crosslinked polymeric partitioning agent is formed and anchored in place.

The novel chromatographic columns of this invention contemplate the chemical reaction of at least two materials. For example, in the first embodiment, i.e., FIG. 1, there is contemplated a chemical reaction between the partitioning agent 13 and the interior wall 12 of column 10. In the embodiment of FIG. 2, there is contemplated a chemical reaction between wall 12 of column 10 and the coupling agent 14. As noted earlier, under at least some conditions, there can be a chemical reaction between the coupling agent 14 and the partitioning agent 13. In the embodiments which illustrate packed columns, FIGS. 4–6, there is contemplated a chemical reaction between the particulate packing material 23 and the partitioning agent 24 and a chemical reaction between the partitioning agent 24 and the column wall 22, if no coupling agent is used. Thus, it is evident that the column wall material must be capable of chemical interaction with the partitioning agent or, if used, the coupling agent; and the particulate packing material, when used, must be capable of chemical interaction with the partitioning agent or, if used, the coupling agent. The coupling agents, when used, must not only be capable of chemical interaction between the column wall and particulate packing material but must also be capable of either or both chemical reaction and physical interlocking with the partitioning agent. In view of the similarities between the capillary columns and the packed columns, the materials useful for one column are also useful for the other column. For example, a partitioning agent which can be used in the capillary column can also be used in a packed column; a coupling agent useful in a capillary column can be used in a packed column; and, in the case of a packed column, a coupling agent capable of reacting with a column wall can also be used as the coupling agent between the particulate packing material and the partitioning agent providing that the reactive sites of the column wall and the packing material are chemically reactive with the coupling agent. In addition to the similarity between the materials useful for both a packed and capillary column, a method for preparing the packed column is similar to that used for the capillary column embodiments.

The interior wall 12 or 22 of the chromatographic columns of this invention can comprise any material that is capable of entering into a chemical reaction with the partitioning agent or coupling agent, when used. Particularly preferred are such materials having exposed surface hydroxyl groups. Such materials include glass, steel, aluminum, chromium, tin, nickel and the like, with steel being presently preferred. In like manner, the particulate packing material of the packed columns comprises any material that is capable of entering into a chemical reaction with the partitioning agent or coupling agent, when used, through chemically reactive sites such as surface hydroxyl groups. Representative of suitable packing materials are diatomaceous earth, fire brick, silica and the like. The intermediate film or coupling agent provides a means for chemically coupling or bonding the partitioning agent to the column wall or particulate packing material. Thus, the coupling agent must be a material which is capable of entering into a chemical reaction with the column wall or the particulate packing material, when used. In addition, the coupling agent must be capable of chemically interacting with the partitioning agent, or physically interlocking with the partitioning agent such as by chain entanglement, or a combination of chemically interacting with chain entanglement. Thus, coupling agents which are suitable for use in the practice of the invention must have a reactive group capable of chemically reacting with the reactive site provided by the column wall or the packing material and, in order to chemically react with the partitioning agent, must have a polymerizable functional group, such as vinyl. The polymerizable functional group copolymerizes with a partitioning agent-forming monomer or graft polymerization is initiated in the group, to form the initial bond between the coupling agent and the partitioning agent. The partitioning agent can comprise any material that would chemically bond with the column wall according to the first embodiment of this invention or chemically bond to the particulate packing material according to the third embodiment of the invention. In addition, the partitioning agent must be capable of forming an integral chemical or physical bond or a combination of chemical and physical bonds, to the coupling agent according to the second embodiment of this invention or the embodiments of FIGS. 4–6.

By way of illustration, and not limitation, let it be assumed that the surface walls contain surface hydroxyl groups and a coupling agent is to be used according to the second embodiment of this invention. This illustration of the selected partitioning agent is to be a cross-linked copolymer of styrene-divinylbenzene-ethylvinylbenzene. The coupling agent employed in this illustration is vinyltriethoxysilane. The alkoxy moiety reacts with the surface hydroxyl groups of the wall and with adsorbed water molecules according to relationships such as the following:

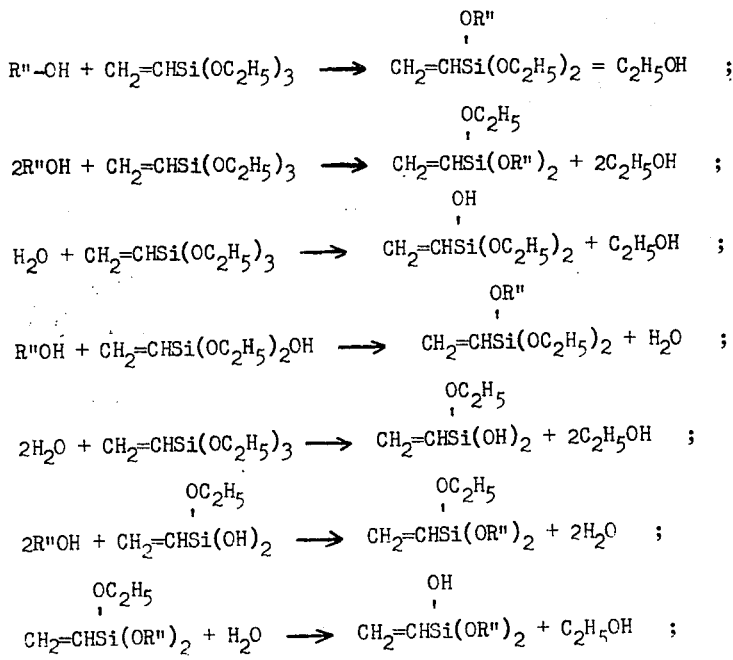

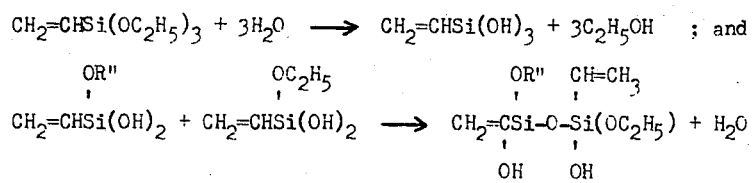

The last of these equations is a condensation reaction which is the start of a polymerization process in the coupling agent (as distinct from the chemical reaction with the support). These reactions are listed for illustration of the types of reaction this coupling agent can undergo.

By reactions such as the foregoing, the coupling agent is chemically bonded to the interior wall of the column or the surface of the particulate packing material, yet presents polymerizable functional groups, e.g., $CH_2=CH-$.

When the mixture of polymerizable styrene, divinylbenzene, and ethylvinylbenzene monomers is introduced into the system, together with the polymerization catalyst such as dibenzoyl peroxide, the functional group $CH_2=CH-$ polymerizes into the polyaromatic radical wherein the crosslinked polyaromatic material is chemically bonded to the coupling agent. It will be readily apparent that other free radical polymerization initiators can be used in peroxy free radicals.

The following examples illustrate the practice of the present invention.

EXAMPLE I

The interior surface of a 60 foot length of 0.01 inch (I.D.) stainless steel tubing was washed successively with n-pentane, acetone and methanol. A coupling agent solution was prepared by mixing vinyltriethoxysilane, methanol and water in the following volume percents: 15 percent, 75 percent, 10 percent, respectively. A slug (3–4 ml) of the solution was forced through the column by pressurized heat to coat the interior surface of the column with a coupling agent solution. Prior to forcing the coupling agent solution through the column, the column was purged by flowing water-saturated helium through the column for about 2 hours. After forcing the coupling agent solution through the column, the column was purged by flowing helium therethrough for about 2 hours. A small slug (3–5 ml) of distilled water having about 0.1 weight percent sulfuric acid added thereto was passed through the column with water-saturated helium. The ends of the column were then plugged and the column was heated to 150° C. for about 4 hours. The column was then washed with distilled water to remove sulfuric acid traces and then heated with helium to 130° C. for 2 hours.

The column prepared according to the procedures set forth above was used to analyze the mixture of normal alkanes having from 5–7 carbon atoms. Only very little separation resulted and none of the components resolved.

EXAMPLE II

A partitioning agent solution was prepared by dissolving 2 grams of practical divinylbenzene containing 55.5 weight percent divinylbenzene, 39.3 weight percent ethylvinylbenzene and 3.4 weight percent diethylbenzene; 2 grams of styrene, 0.02 gram of lauryl peroxide; and 4 grams of normal heptane. A slug (3–4 ml) of the partitioning agent solution was forced through the column by the pressurized dry helium. As soon as the plug exited, the column was capped off and heated to 70° C. for 4 hours.

The column prepared according to the procedure set forth above was used to analyze the mixture of normal alkanes having from 5–7 carbon atoms. The chromatograph presented in FIG. 7 illustrates the effectiveness of the column in separating the mixture into the indicated components. The column showed about 1,000 theoretical plates per foot at the conditions at which it was operated illustrating high efficiency. Analysis times were between 2 and 3 minutes illustrating high strip capabilities.

The column was further employed to analyze a mixture containing n-butylbenzene, isopropylbenzene, o-xylene, ethylbenzene, toluene and benzene. The chromatogram presented in FIG. 8 illustrates the effectiveness of the column in separating the mixture into the indicated components.

Reasonable variations and modifications are possible within the scope of the disclosure, the drawings, and the appended claims.

I claim:

1. A chromatographic column comprising:
   a hollow member;
   a partitioning agent disposed within the inner volume of said member, said agent comprising a continuous discrete film of a crosslinked polymeric material comprising a copolymer of at least one divinyl aromatic hydrocarbon and at least one monovinyl aromatic hydrocarbon, wherein said divinyl aromatic hydrocarbon is present in said copolymer in an amount ranging from 20 to 75 weight percent; and
   a coupling agent, said coupling agent being disposed as an essentially continuous discrete film between said crosslinked polymeric partitioning agent and said hollow member, said coupling agent being integrally bonded at least chemically through valence bonds to the inner surface of said hollow member and to said partitioning agent by a bonding means selected from the group consisting of chemically bonding through valence bonds, physical interlocking or a combination of chemical and physical means.

2. The chromatographic column of claim 1 wherein said coupling agent is a vinylalkyloxysilane compound characterized by the formula

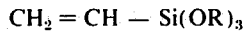

wherein R is an alkyl radical having from one to eight carbon atoms.

3. The chromatographic column of claim 1 further comprising:
   a particulate support material disposed within the inner volume of said hollow member.

4. The chromatographic column of claim 3 wherein said coupling agent is disposed within the inner volume of said hollow member as an essentially continuous discrete layer upon said support material intermediate said support material and said partitioning agent.

5. The chromatographic column of claim 3 wherein said partitioning agent is disposed within the inner volume of said hollow member as a continuous layer upon the exposed surface of said support material and wherein said film of partitioning agent bonded to said coupling agent forms a continuous film with the partitioning agent on said support material.

6. The chromatographic column of claim 2 wherein said coupling agent is vinyltriethoxysilane and said crosslinked polymeric partitioning agent is a copolymer of styrene, divinylbenzene and ethylvinylbenzene.

7. An apparatus for the separation of a fluid stream and a component fraction comprising:
   a hollow member;
   a partitioning agent disposed within the inner volume of said member, said agent comprising a continuous discrete film of a crosslinked polymeric material comprising a copolymer of at least one divinyl aromatic hydrocarbon and at least one monovinyl aromatic hydrocarbon, wherein said divinyl aromatic hydrocarbon is present in said copolymer in an amount ranging from 20 to 75 weight percent;
   a coupling agent, said coupling agent being disposed as an essentially continuous discrete film between said crosslinked polymeric partitioning agent and said hollow member, said coupling agent being integrally bonded at least chemically through valence bonds to the inner surface of said hollow member and to said partitioning agent by a bonding means selected from the group consisting of chemically bonding through valence bonds, physical interlocking or a combination of chemical and physical means;
   means to introduce a fluid stream into said hollow member for separation of at least one component fraction;
   means to drive said fluid stream in a generally axial direction through said hollow member; and
   means to withdraw one or more component fractions from said hollow member.

8. The apparatus of claim 7 wherein said coupling agent is a vinylalkyloxysilane compound characterized by the formula

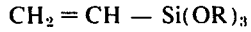

wherein R is an alkyl radical having from one to eight carbon atoms.

9. The apparatus of claim 7 further comprising:
   a particulate support material disposed within the inner volume of said hollow member.

10. The apparatus of claim 9 wherein said coupling agent is disposed within the inner volume of said hollow member as an essentially continuous discrete layer upon said support material intermediate said support material and said partitioning agent.

11. The apparatus of claim 9 wherein said partitioning agent is disposed within the inner volume of said hollow member as a continuous layer upon the exposed surface of said support material and wherein said film of partitioning agent bonded to said coupling agent forms a continuous film with the partitioning agent on said support material.

12. The apparatus of claim 7 wherein said coupling agent is vinyltriethoxysilane and said crosslinked polymeric partitioning agent is a copolymer of styrene, divinylbenzene and ethylvinylbenzene.

13. A process for preparing a chromatographic column comprising:
   coating the interior surface of a hollow member with a coupling agent, said coupling agent being characterized by the presence of reactive groups capable of reacting with said interior surface and containing also polymerizable reactive sites;
   washing said coated surface with an inert diluent to remove excess coupling agent;
   coating said coupling agent-coated inner wall with a partitioning agent-forming polymerizable monomer to substantially uniform finite thickness, said partitioning agent comprising a copolymer of at least one divinyl aromatic hydrocarbon and at least one monovinyl aromatic hydrocarbon, wherein said divinyl aromatic hydrocarbon is present in said copolymer in an amount ranging from 20 to 75 weight percent;
   polymerizing in situ said monomer to form an essentially continuous crosslinked polymeric phase of substantially uniform finite thickness, said polymeric phase being integrally bonded to said coupling agent by at least one means selected from the group consisting of chemically bonding through valence bonds, physical interlocking, or a combination of physical and chemical means.

14. The process of claim 13 wherein said coupling agent is a vinylalkyloxysilane compound characterized by the formula

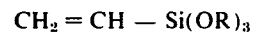

wherein R is an alkyl radical having from one to eight carbon atoms.

15. A process according to claim 13 further comprising packing the interior volume of said hollow member with discrete particles of support material.

16. A process according to claim 13 further comprising coating the interior surface of said hollow member with a mixture of said coupling agent and said partitioning agent-forming polymerizable monomer to a substantially uniform finite thickness, polymerizing in situ said continuous first crosslinked polymeric phase of substantially uniform finite thickness, coating said first polymeric phase with a partitioning agent-forming polymerizable monomer to a substantially uniform finite thickness, and polymerizing in situ said polymerizable monomer to form an essentially continuous second crosslinked polymeric phase.

17. A process according to claim 16 wherein said coupling agent is vinyltriethoxysilane and said partitioning agent-forming polymerizable monomer is a mixture of styrene, divinylbenzene and ethylvinylbenzene.

* * * * *